G. B. HICKOK, DEC'D.
M. L. HICKOK, ADMINISTRATRIX.
SPRING VEHICLE WHEEL.
APPLICATION FILED MAR. 15, 1915.
1,151,878.
Patented Aug. 31, 1915.
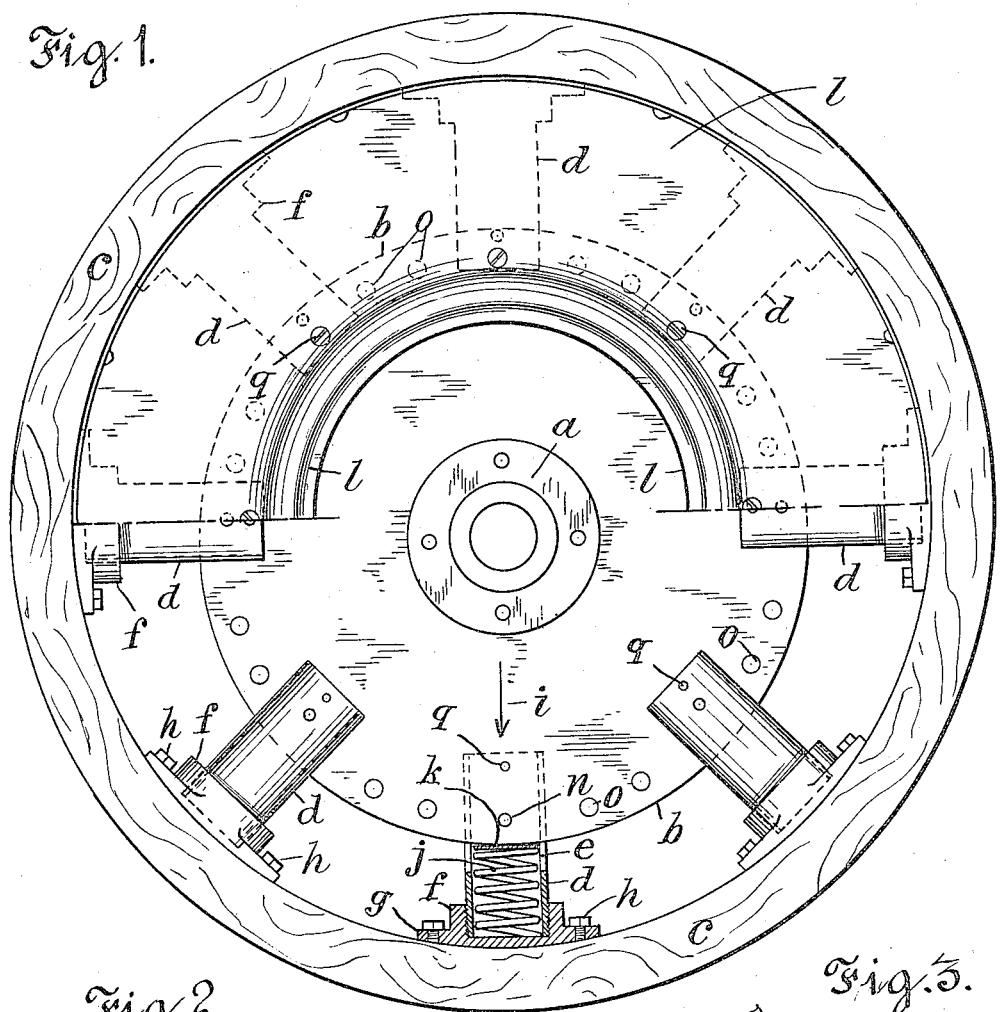
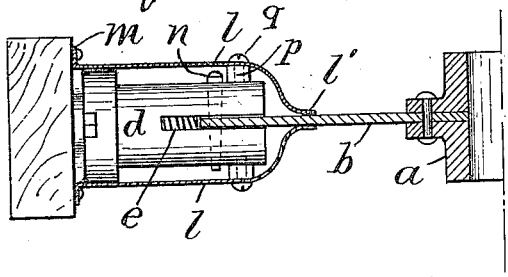
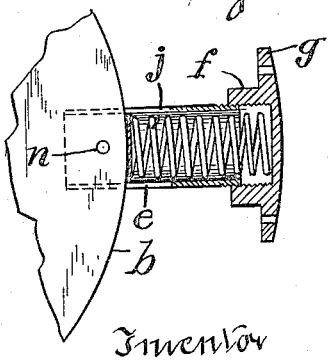

UNITED STATES PATENT OFFICE.

GEORGE B. HICKOK, OF ROSELLE PARK, NEW JERSEY; MARY L. HICKOK ADMINISTRATRIX OF SAID GEORGE B. HICKOK, DECEASED.

SPRING VEHICLE-WHEEL.

1,151,878.   Specification of Letters Patent.   Patented Aug. 31, 1915.

Application filed March 15, 1915. Serial No. 14,302.

*To all whom it may concern:*

Be it known that I, GEORGE B. HICKOK, a citizen of the United States, residing at 321 Chestnut street, Roselle Park, county of Union, and State of New Jersey, have invented certain new and useful Improvements in Spring Vehicle-Wheels, fully described and represented in the following specification and the accompanying drawings, forming a part of the same.

This invention relates to a vehicle wheel having a hub movable in relation to the rim and springs interposed between the hub and rim to sustain the load elastically.

The construction includes a center-plate supported by a hub, and spring-casings connected to the inner side of the rim and slotted to embrace the edge of the said plate, and springs fitted between the edge of the center-plate and the inner side of the rim.

The construction is very simple and involves no movable parts except the movability of the center-plate in relation to the spring-casings. Such movement at the lower side of the wheel is directly in line with the spring in the casing and tends to compress the same, while the center-plate withdraws in an equal measure from the spring-casing at the top of the wheel and permits the spring therein to expand.

The center-plate slides in the slot of the other casings in various directions according to their position in the wheel-rim, and a washer interposed between the end of each spring and the edge of the plate, to support the spring in this sliding motion.

The sliding of the springs upon the edge of the center-plate causes ample friction to drive the wheel if the hub be rotated by power; but pins may also be inserted through the edge of the plate, if desired, at opposite sides of each spring-casing to transmit the driving power of the plate positively to the rim.

The invention will be understood by reference to the annexed drawing, in which—

Figure 1 is a side view of the wheel with the bottom casing in section and the cheek upon the wheel omitted below the center line; Fig. 2 is a transverse section of the wheel at the left-hand side of the center line, the wheel-rim, the center-plate and cheeks being shown in section, and the spring-casing not in section; and Fig. 3 shows one of the spring-casings with the adjacent edge of the disk pinned thereto, the casing being in section at the nearer side of the center-plate.

*a* designates the hub by which the wheel would be carried upon an axle; *b* the center-plate, *c* the wheel-rim, and *d* the spring-casings provided with slots *e* which fit movably upon the edge of the plate *b*.

Each spring-casing, as shown in Figs. 1 and 3, is threaded at its outer end and fitted to a threaded cup *f* having lugs *g* for securing it by bolts *h* to the inner side of the rim. The rim is shown made of wood, but may be made of any material and of any cross-section, and the cups or spring-casings may be connected thereto by any suitable means.

In Fig. 1, the center-plate *b* is shown eccentric to the wheel-rim as if forced downward in the direction of the arrow *i* by a load upon the axle, the spring *j* within the casing *d* being thus compressed to support the load elastically. A thin washer *k* is shown between the inner end of the spring and the edge of the center-plate, and the outer end of the spring is shown in contact with the bottom of the cup *f*.

The springs within the two spring-casings which are next adjacent to the bottom casing, are also compressed in some degree, while the springs horizontally at opposite sides of the hub are not compressed, and the three springs in the upper half of the wheel are relaxed or somewhat extended by the movement of the center-plate away from the rim. The center plate is thus held elastically by all of the springs in every position of the wheel.

The inner ends of the cylindrical casings are open, as shown in Figs. 1 and 3, as well as a portion of the slot *e*, as shown in Fig. 2, and to prevent the intrusion of dirt into the casings through these openings, annular cheeks *l* are shown secured to the inner sides of the rim by flanges m on both sides of the casings, and the inner edges l' of the cheeks are fitted to the opposite sides of the center-plate so as to wholly inclose the spring-casing, while permitting the plate and the springs to move freely in relation to one another.

To brace or stiffly support the inner ends of the spring-casings, they are secured to the cheeks l by screws q inserted through the cheeks and through collars p into the wall of the casing. Pins o are shown inserted transversely in the center-plate near the edge at the opposite side of each of the spring-casings, to prevent the center-plate from turning around within the rim; and this effects a positive rotation of the rim when the center-plate is rotated.

It is obviously necessary that the springs in all the casings should be under tension or exert expansive force when the center-plate is in the center of the rim; and to assemble the parts it is necessary to compress the springs in the casings before applying the rim to the wheel. This is effected by locking the spring-casings to the center-plate, then inserting the springs in the outer ends of the casings, and finally screwing the cups upon such ends of the casing with the effect of compressing the springs in the required manner.

The spring before compression, is illustrated in Fig. 3 with the cup applied to the outer end of the casing to compress the spring. The pressure of the spring toward the opposite end of the casing is, during such screwing operation, resisted by a locking-pin n which is inserted through the casing and center-plate, as shown in Figs. 2 and 3. The spring-casings are secured upon the center-plate during such operation in such a position, that when the cups are all screwed tightly down upon the outer ends of the casings their peripheries will coincide with the interior of the rim which can then be set upon the outer sides of the cups and the cups bolted thereto.

The pin n is shown tapering in Fig. 2, which facilitates its removal from the holes, to which it is fitted in the casing and center-plate, after the rim is set in place. The pins n can be removed when the rim is screwed upon the casings, as shown in Fig. 1, which removal would be effected before the cheeks l are applied. The cheeks l and pin n are both, for convenience, shown in Fig. 2, but it will be understood that the pins are removed before the wheel can be used.

When the pins are removed from the slotted ends of the casings, the center-plate remains in the same position, with the balanced forces of all the springs exerted upon it, until it is placed upon an axle and subjected to a load, when each spring in succession is subjected to the compressing action of the plate.

It will be understood that the size of the center-plate and of the spring-casings, and the strength of the springs, would be varied to suit the use for which the wheel was intended. The pins o are wholly optional, and may be used in cases where the friction of the springs upon the edge of the center-plate is not considered sufficient to propel the load carried by the vehicle.

Having thus set forth the nature of the invention what is claimed herein is:

1. In a vehicle wheel, the combination, with a hub and a center-plate carried thereby, of a rim having a series of spring-casings secured separately and detachably to its inner side and slotted each to embrace the edge of the plate, and springs inserted between the rim and such edge.

2. In a vehicle wheel, the combination, with a hub and a center-plate carried thereby, of a rim having a series of threaded cups secured detachably to its inner side, spring-casings screwed into the said cups and slotted to embrace the edge of the plate, and springs fitted between the bottoms of the cups and the said edge.

3. In a vehicle wheel, the combination, with a hub and a center-plate carried thereby, of a rim having a series of threaded cups secured detachably to its inner side, spring-casings screwed into the said cups and slotted to embrace the edge of the plate, springs fitted between the bottoms of the cups and the said edge, and means for locking the slotted ends of the casings to the plate during the compression of the springs therein.

4. In a vehicle wheel, the combination, with a loose rim, of a center-plate, spring-casings slotted to embrace the same and pinned fast to the same temporarily, threaded cups fitted to the outer ends of the casings and adapted to compress the springs therein, and means for securing the cups to the inner sides of the rim when the casings are pinned to the center-plate.

5. In a vehicle wheel, the combination, with a hub and a center plate carried thereby, of a rim having a series of spring-casings projected inwardly and slotted to embrace the edge of the plate, springs inserted between the rim and the edge of the plate, and cheek-plates fitted to the rim at opposite sides of the casings and formed to contact with opposite sides of the plate to exclude dust from the interior of the casings.

6. In a vehicle wheel, the combination, with a hub and a center-plate carried thereby, of a rim having a series of spring-casings projected inwardly and slotted to embrace the edge of the plate, springs inserted between the rim and the edge of the plate, cheek-plates fitted to the rim at opposite sides of the casings and formed to contact with opposite sides of the plate, and connections between such cheek-plates and the slotted ends of the spring-casings, to brace the same in relation to the rim and one another.

In testimony whereof I have hereunto set my hand in the presence of two subscribing witnesses.

GEORGE B. HICKOK.

Witnesses:
JAMES W. GREENBOWE,
THOMAS S. CRANE.